UNITED STATES PATENT OFFICE 2,003,887

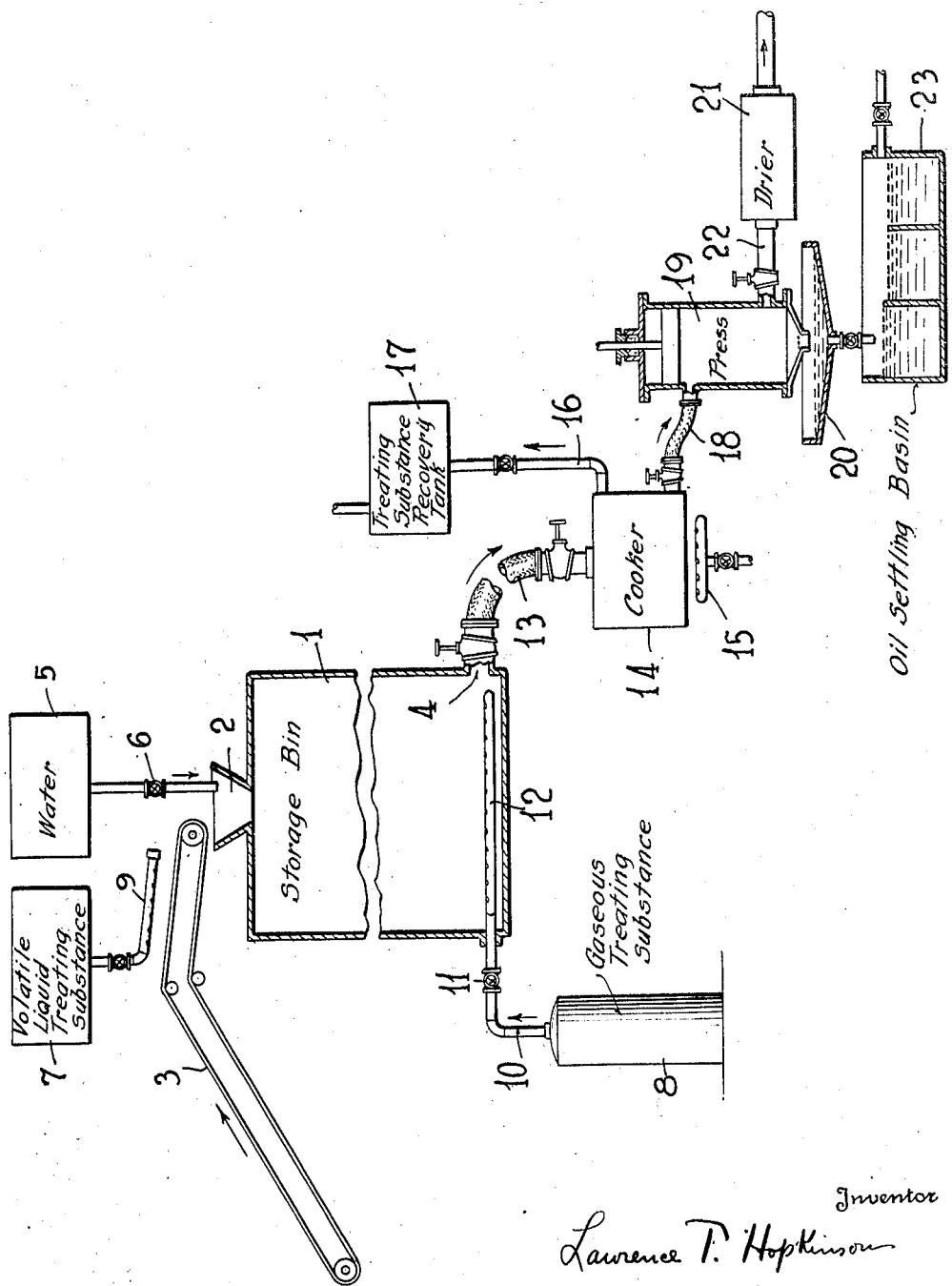

PRODUCTION OF FERTILIZER

Lawrence T. Hopkinson, Washington, D. C.

Application November 30, 1934, Serial No. 755,486

13 Claims. (Cl. 87—6)

This application is a continuation of my copending application Serial No. 464,631, Production of fertilizer meal and oil filed in the United States Patent Office June 28, 1930, and of my copending application Serial No. 732,549, Production of fertilizer meal and oil filed in the United States Patent Office June 26, 1934, and constitutes a consolidation of those two applications.

The invention relates to the processing of fish material to produce fertilizer or meal cake, with fish oil as an important by-product. Its principal objects are to increase the yield, improve the products, and lower the cost of production. The manner in which these and other ancillary objects and advantages are attained will be made clear as the details of the invention are explained hereinafter.

Fish meal and fish oil are well known articles of commerce produced from inedible or "trash" fish such as the menhaden, and also largely as by-products of the food fish industries by processing the waste thereof, i. e., the heads, entrails and other inedible parts of food fish. The salmon is a notable source of meal and oil, and each year large quantities of meal and oil are produced from the waste of the salmon canneries. Meal and oil are derived also from other fish material, and my invention is applicable to the processing of such other material, being in no way dependent on the use of particular parts of fish carcasses or particular species of fish.

Throughout this specification and in the appended claims it is to be understood that the term "fish" includes all marine animals from which meal and/or oil is capable of being produced.

Fish meal is, broadly speaking, the dried solid matter of the fish material from which it is produced, i. e., it is, as nearly as can be practically and economically made, the aggregate of the solid constituents of the fish material, deprived of as much as possible of the oil and water which naturally occur in the raw material. It is used principally as a fertilizer or fertilizer ingredient and as feed for live stock.

Commercial fish oil is, broadly speaking, the oil naturally occurring in the fish material from which it is produced, freed as far as is economically practicable of the solid matter and water of the fish.

As commercial products the meal and oil are obviously superior and command better prices in proportion as each is devoid of adulteration by the other. A reasonable degree of purity is desirable in the case of the oil, but it is absolutely essential that the meal contain not more than a certain critical percentage of oil because an oil content higher than the critical minimum (which varies with the type of raw material used, the temperature to which the meal is to be subjected in transit, storage, etc., and other factors, but which in general may be said to be approximately eight per cent) causes the meal to become rancid. Moreover, the presence of oil in any proportion impairs to that extent the usefulness of the meal as fertilizer, so that it may be stated as a general proposition that the value of the meal is increased as its oil content is decreased. When it is remembered that the oil, which is undesirable and even harmful when combined with the meal, commands a good price when separated from the meal, the importance of economically effecting a substantially complete separation of the oil from the meal ingredients of the raw material will be appreciated.

As has been stated above, the meal is used principally as fertilizer and stock feed. The water extracted from the waste is discarded. Many of the solid constituents of the fish waste which are high in food and fertilizer value, chiefly albumin, gelatinous substances, readily available nitrogen, various phosphates, and various chlorides, are normally soluble in water or the oil, or become finely divided and suspended therein, and are consequently lost with the discarded water or remain in the oil as adulterants and undesirable impurities. It follows from the foregoing that a processing method which is effective to retain in the solid portion of the raw material the ingredients heretofore lost as just explained is superior to the conventional methods which result in losses of those ingredients with the discarded water or their admixture with and adulteration of the oil product.

According to the best present practice the material is heated and then pressed. The heating breaks down the cellular structure of the fish material and permits the oil and water to be removed from the solid material. This removal is generally accomplished by pressing. The oil is then separated from the water by decanting, centrifuging or otherwise.

A serious defect in the prior art methods, typified by that just described, is that the heating of the material so thoroughly breaks down the cellular structure of the fish that the heated material is reduced to a thin, almost homogeneously mushy consistency. It results that much of the originally solid matter passes through the interstices of the press screen with the water and oil some of which is lost with the water and some of which adulterates the oil, as has been explained. Recovery of the dissolved and suspended solids from the liquids is too expensive to be commercially practicable. The difficulty is a serious one and cannot be overcome by using screen of finer mesh, or working the press at lower pressure, because such apparent remedies inevitably result in leaving in the meal such high proportions of oil that the meal quickly becomes rancid.

In other words, the industry has heretofore had a choice of only two expedients, both of which are unsatisfactory: expressing the oil thoroughly from the meal, resulting in oil so badly contaminated that it cannot be profitably purified, or expressing substantially less than a full yield of oil from the meal, resulting in a very short yield of oil and a meal cake product with which expensive and impractical precautions must be taken to prevent spoilage.

A primary object therefore of the present invention is to provide a method of processing fish material which results directly in full yields of substantially oil-free meal and uncontaminated oil, and a feature of my new method which is of vital importance is the fact that the slight excess of its cost over that of the present method is more than offset by the increased value of the yield due to the heretofore unattainable purity of the products and the greater quantity in which those products are obtained. In other words, for a very slightly higher operating cost my new method produces a considerably more valuable yield of meal and oil from any given batch of raw material on which the standard prior art method could have been practiced.

Broadly, a preferred embodiment of my new method comprises treating the raw material with relatively small amounts of an inexpensive substance which has the property of rendering the solid constituents of the material relatively firm and self-sustaining, with the cell structure and connective tissue substantially intact, loosening the liquids from the solids without softening or dissolving the solid matter or causing it to slough off or become finely divided. A subsequent short period of heating enhances the hardening and oil separation action and effect of the treatment step so that the liquids may be readily expressed from the solids by operating a relatively large mesh press in which commercially oil-free meal is retained and a liquid consisting of commercially pure oil and water is expressed. The invention is thus to be distinguished from the various methods which have been proposed for purifying or refining the oil product of the conventional process. According to these proposals untreated material was digested and pressed to free the meal of substantially all the oil. The highly contaminated oil was then treated to purify it. All proposed treatments of this kind have entailed excessive costs. One of the important objects of my present invention in a preferred form of embodiment is the elimination of these final oil purifying operations.

A further important feature and advantage of my present invention resides in the capacity of my treating substance to function as a preservative for the raw material, together with an important economy which I may achieve by associating the two heating steps, the first intended to drive off the treating substance and the second intended to digest the material and complete its treatment, so closely that much of the heat of the first step is utilized in the second step. This feature of the invention may be briefly explained as follows:

The raw material from which the products resulting from practice of the present invention are made is subject to exceedingly rapid decomposition. When fish or fish waste has suffered even the first stages of decomposition its usefulness for industrial purposes is seriously impaired, and this failure of the material becomes progressively greater as decomposition proceeds, so that under certain climatic conditions frequently encountered operation upon the fish material from which the meal and oil are to be produced must be begun within a few hours after the fish have been taken from the water and must be continued without interruption to completion. The fisheries and canneries are of necessity almost always located in places more or less remote from populous communities and are profitably manned by a minimum of permanently maintained labor. In cases where the raw material is the waste of food fish, i. e., the skins, heads, bones, tails, entrails, etc., the entire force of a given cannery is required to process the food portion of the fish when a catch is brought in. When operation on the food products has been completed it is in many cases too late to begin operation on the waste which has in the meantime passed the critical stage of decomposition. Under present methods of handling the waste a large portion of available material has been sacrificed in this way, and the waste which has been successfully operated upon has entailed the installation of reduction equipment at each cannery and the services of special labor additional to that employed in the preparation of the food portion of the fish. By present methods, therefore, the labor at a cannery must either be large enough to process simultaneously both the food portions of the fish and the waste immediately upon arrival of a catch, remaining idle between catches, or must be so small as to handle the food production alone, sacrificing the waste.

One of the objects of my present invention is to provide a process whereby indefinitely large quantities of fish waste may be operated upon without the loss of any part thereof by a minimum of labor operating at its convenience over any length of time, however protracted. I attain this object because the treatment material used in part for the purpose hereinbefore indicated has the important additional function of preserving the fish material to which it is applied so that such material resists decomposition under the most adverse climatic and weather conditions for periods longer than the longest delay between the time of catching and an opportunity to process which is ever encountered in the industry. Hence, in the practice of my new method there is no spoilage loss of raw material and no impairing of product values by partial decomposition of the raw material.

The important operating economy above referred to is a saving of fuel and processing time effected as follows:

Adulterants and impurities are undesirable in the final products; hence it is necessary to remove the treating substance before the final products are reached. I use a treating substance which is volatile, or capable of being driven from the material by heating. After treatment the material is initially heated, the treating substance driven off and preferably recovered for reuse; then while the material is still warm additional heat is applied to digest it. Much or all of the quantity of heat put into the material during the first heating step and the temperature to which the material is therein raised is thus made available to shorten the heating time and intensity of the second heating step.

It will be observed that to realize all the advantages of the invention the treating substances must be (1) capable of rendering the solid constituents of the material relatively hard or firm during the application of the digesting heat and thereafter during a subsequent pressing operation, (2) capable of preserving the material against decomposition, and (3) capable of being driven from the material by heat. However, it is obvious that for use in special cases the treating substance need not combine all three qualities. Thus, if the purity of the oil by-product is not a matter of consequence, or if the raw material consists of whole fish, like the menhaden, herring, pilchard, etc., and unusually efficient mechanical equipment and highly skilled operatives are employed so that there is little likelihood that solid matter will pass in objectionable amounts through the press openings, a substance lacking the first named quality may be satisfactory. The invention is thus seen to be capable of being variously practiced to suit different conditions of operation, kinds of raw material, kinds of products desired, etc., and the appended claims by which the invention is defined are to be construed broadly to cover the broad, fundamental principles of the invention herein explained.

I have found that formaldehyde in its various forms and acetaldehyde possess the three qualities just indicated and chlorine possesses the latter two. I treat the raw material with these substances, any one of them or any combination of them, then immediately or whenever a convenient opportunity is presented I heat the treated material to drive off the treating substance, preferably collecting it for reuse, and then, preferably while the material is still warm, I apply more heat to digest it. The solid and liquid constituents are then easily and completely separated as by pressing, and the oil is then separated from the water in any convenient manner, as by decanting, filtering, centrifuging or otherwise.

In certain of the claims I define the preservative as one which is volatile at temperatures low enough to be non-destructive of the material. By this I mean that the preservative is capable of being driven out of the treated material by heating the material to temperatures which are not high enough to render the material incapable of being processed to produce meal or oil.

A particular and preferred embodiment of the invention will now be specifically explained, reference being made to the attached drawing comprising a sort of flow sheet illustrating the invention and incidentally illustrating diagrammatically a type of apparatus which may be conveniently employed in practicing the method.

In the drawing the reference numeral 1 designates a storage bin of any suitable shape and preferably of relatively large capacity, having a mouth 2 into which the raw material to be operated upon is charged by any suitable means such for example as the endless belt conveyer indicated at 3. The bin is provided at its lower part with an outlet 4 containing a valve. A tank 5 may be arranged to discharge water into the bin by gravity under the control of a suitable valve 6.

The bin 1 serves the double purpose of a storage container and a vessel for effecting treatment of the raw material. To this latter end I associate with the bin treating substance supply tanks 7 and 8. One of these tanks, designated 7 in the drawing, is designed to contain a liquid treating substance, such for example as acetaldehyde or the solution of formaldehyde sold under the name of formalin, both of which are volatile within the meaning of that term as used in this specification and the appended claims. This supply tank 7 is best positioned above the storage tank 1. I have found that when the type of conveyer shown in the drawing is used excellent results are obtained by locating the liquid supply tank so that it may feed by gravity a spray outlet 9 just above the discharge end of the conveyer. It will be appreciated however that insofar as the broad principles of the invention are concerned it is immaterial how or by what sort of apparatus the treating substance is introduced into the raw material.

The tank 8 is designed to contain a gaseous treating substance, or one which while normally gaseous may be stored in the tank under high pressure as a liquid. As indicated hereinabove, formaldehyde and chlorine are examples of such gaseous treating substance. The tank 8 connects with the bin 1 through a pipe 10 containing a valve 11 and terminating in a diffusing outlet 12 built into the lower part of the bin 1.

Arranged to receive treated material from the storage bin, through a suitably valved conduit 13 or otherwise, I provide a cooker 14 with which may be associated a burner 15 for heating material charged into the cooker. Of course other means for heating the cooker contents may be employed. The cooker is provided with a valved outlet 16 in its upper portion connected to a treating substance recovery tank 17, and may have an outlet conduit 18 in its lower portion, or other suitable means for effecting transfer of the cooked material to a press 19.

The latter may consist of any suitable type of press, preferably one capable of exerting pressures of about 400 pounds per square inch and provided with the usual strainers, drip pan 20 and other usual means for effecting separation of liquids from the solid matter charged into the press. With the press various customary appurtenances may be associated, such as the drier 21 connected with the press by a valved conduit 22, and an oil settling basin 23 for receiving the liquid discharge of the drip pan.

Practice of my method, when substantially the apparatus explained above is employed, proceeds as follows:

Raw fish material, which may be waste or whole fish carcasses, or any other fish material intermediate these extremes, is loaded onto the receiving end of conveyer 3 and is charged therefrom into the bin 1. Just before leaving the conveyer the material may, if desired, be treated with one or more of the volatile liquid treating substances contemplated by the invention and contained within the supply tank 7, which may be partitioned or otherwise arranged to be capable of supplying selectively any one or any group of the liquid treating substances. The material may if desired be charged untreated into the bin and there treated by percolation up through its mass of gaseous treating substance, supplied from the tank 8, which may likewise be partitioned or otherwise arranged to supply selectively any one or any group of the gaseous treating substances contemplated by the invention. It is of course entirely practicable to employ both the liquid and gaseous treatments simultaneously or successively on the same material.

With the material, water from the tank 5 may be introduced into the bin to cover the material and to serve as a solvent or carrier for the treating substance whereby the latter may be carried throughout the mass and be brought into intimate contact with all parts thereof.

The proportion of treating substance required will depend in practice upon climatic conditions, the length of time which is to intervene between treating and cooking, the specific material under treatment, and other factors. I have found, however, that properly to treat one ton of average material under typical conditions there will be required approximately 2 to 4 pounds of formaldehyde or 20 to 30 pounds of acetaldehyde, or 3 pounds of chlorine. The suggested proportion of chlorine is applicable to non-oily fish material, such as haddock and cod. Somewhat more chlorine is required to treat oily fish material, such as herring and menhaden, or material which is to be stored for protracted periods or in an open vessel. For convenience in handling it is preferable to use the aldehyde in water solution; formaldehyde as formalin, which is the commercial solution containing about 40 per cent formaldehyde, or acetaldehyde dissolved in substantially an equal weight of water. It is evident that to process a ton of average raw material from 5 to 10 pounds of formalin or from 40 to 60 pounds of 50 per cent solution of acetaldehyde is required. These proportions are to some extent necessarily a matter for selection and experiment, and will vary with the temperature at which the processing is practiced, the freshness or staleness of the material, and other considerations, as will be understood.

The treated material is proof against spoilage, and may therefore be accumulated in the bin over any reasonable period of time pending the building up of a sufficient quantity and/or a convenient opportunity to continue with the processing, or the succeeding steps of the process may be practiced immediately.

Treatment of the material in the bin 1 with any of the substances having the three qualities enumerated hereinabove results almost immediately in the material assuming a firm, tough condition and in the liberation of a substantial part of the contained oil. The solid constituents of the material, including cell structure and connective tissue, become very materially firm, almost to the point where they might be called hard, and individual particles of the solid raw material do not break down into smaller particles. Hence, all individual pieces of the raw material which are initially too large to pass through the interstices of the press screen, remain too large and are retained on the screen. A distinct and important advantage of this feature of my method is that I am able to use raw material exactly as it comes from the nets or from the cannery cleaning operation. I am saved the expense of pulping or otherwise comminuting it, and I eliminate all the separating difficulties always encountered with pulped or finely divided raw material.

The treated material is charged into the cooker for an initial heating step. This has two primary functions: to drive off the treating substance, which may be allowed to escape to the atmosphere or be recovered in the tank 17, and to perfect or increase and complete the firm or hardened condition of the solid matter and the liberation of oil therefrom if the treating substance be one possessing the three qualities enumerated above. I have found that the treating substances of this class which I have suggested hereinabove possess the peculiar and valuable property of increasing their firming action on the raw material when heat is applied. In this respect they differ essentially from alcohol, which has been tried as a treating substance but which is utterly worthless for this purpose because on heating alcohol treated material becomes extremely thin and "soupy" when it is heated to drive out the alcohol, so that separation of the solid and liquid constituents is rendered commercially impossible.

Treatment with an aldehyde and subsequent heating also cause hardening of the glue contained in the fish material, particularly cod and haddock, thus obviating the necessity of extracting the glue from the raw material. According to present methods raw fish material containing excessive glue is centrifuged to extract the glue. This is necessary because the natural glue if allowed to remain in the material would clog the reduction machinery.

After a short preliminary period of heating the material becomes substantially completely freed of the treating substance. The digesting heat is then applied, preferably promptly before the warmed material cools to any great extent, in order to effect the operating economy hereinbefore explained. During this digesting heating liberation of the oil from the solid matter is completed, the latter fully retaining its firm quality with the initial pieces unbroken but somewhat reduced in size as a result of contraction occasioned by the effect of heat on the treated material.

I prefer to apply formaldehyde at temperatures above about 55° F. to prevent polymerization of the aldehyde.

I have found it desirable, when the raw material is alkaline or partially decomposed, to render the material neutral or slightly acid by adding sulphuric, hydrochloric, nitric or other acid before treating with the aldehyde.

According to the embodiment illustrated by the drawing the digested material is pressed, producing substantially oil-free meal and a liquid consisting substantially exclusively of pure oil and water. The meal is dried of substantially all its occluded water, and the oil is separated from the water with which it is associated, both by any conventional and convenient method. As a practical alternative of the pressing step, the digesting heat may be continued while the material remains in the cooker, long enough to complete digestion and to evaporate all the water, after which the combined solids and oil may be separated by dissolving out the oil. Gasoline, naphtha and the like are solvents which have been used successfully. The oil and the solvent are separated in any convenient way, such as by fractional distillation.

An essentially important feature of my method is its economy. In November 1934 the prices of commercial grades of my treating substances were as follows:

Formalin, 6 cents per pound.
Acetaldehyde, 14 cents per pound.
Chlorine, 6 cents per pound.

The cost of treating a ton of average material with these substances was therefore as follows:

Formalin _____ 7½ lbs__ $0.45
Acetaldehyde _____ 30 lbs__ $4.20
Chlorine _____ 3 lbs__ $0.18

Use of any of these substances, or any combination of them, results in products having a value which is increased over that of the products which could have been obtained without them by an amount far greater than the cost of the treating substances. To this increased value there must be added the value of the vast quantities of raw material which are made available by practice of my method which would otherwise be totally or partially lost through spoilage. Moreover, the volatile nature of the treating substances permits them to be substantially fully recovered for reuse.

My treating substances are capable of rapidly penetrating ordinary fish material to any depths, so that I obtain the important advantage of dispensing with preliminary pulping or comminuting operations, being able to treat whole fish or fish waste exactly as it comes from the cleaning operation. In certain of the appended claims I describe the raw material on which I practice my process as "unpulped". By this I mean that the raw material is not preliminarily ground or equivalently comminuted, but comprises whole fish, parts thereof such as heads, livers, or other entrails, waste fish or fish waste as it comes from processing plants, such as filleting, salting, or canning plants, whether or not such waste fish or fish waste is mangled, lacerated or mutilated, or chunks or pieces into which whole fish have been divided for convenience in handling.

It will be evident from the foregoing that the invention is of wide application and capable of diverse embodiment. Thus for example the spirit of the invention contemplates processing marine animal material to produce either meal or oil or both. To illustrate, the cod contains oil in recoverable quantities in the liver only, hence it is generally desirable to process the livers separately to produce meal and oil, and the remainder of the fish to produce meal only. Such fish as menhaden and herring on the other hand contain recoverable quantities of oil throughout the body and in processing these species meal and oil are produced concurrently. Most shellfish do not contain recoverable oil. Accordingly each of the appended claims is to be construed to cover the invention whether practiced to produce meal or oil or both. The several modifications hereinabove suggested, and all others comprised within the principles of the invention as defined by the appended claims, are to be regarded as within the broad scope and purview thereof.

I claim:

1. The method of processing fish material which comprises accumulating the material in a storage vessel, treating said material with a preservative which is volatile at temperatures low enough to be non-destructive of the material, transferring the preserved material to a second vessel, driving a substantial part of the uncombined preservative from the material in the second vessel by heating, and while the material is still warm applying more heat to digest the material, and processing the material to separate its solid and liquid constituents.

2. The method of processing fish material which comprises accumulating the material by successive charges into a storage vessel, treating the material of each charge with a preservative which is volatile at temperatures low enough to be non-destructive of the material to prevent decomposition, transferring the preserved material to a second vessel, heating the material in the second vessel sufficiently to drive off a substantial part of the uncombined preservative but not sufficiently to complete digestion of the material, and while the material is still warm applying more heat to complete said digestion, and finally separating the solid and liquid constituents of the digested material.

3. The method of processing fish material which comprises accumulating the material in a storage vessel, treating the material in said vessel with formaldehyde, transferring the treated material to a second vessel, driving off the formaldehyde by heating the material in the second vessel, and while the material is still warm applying more heat to digest the residue, and thereafter processing the residue to separate its solid and liquid constituents.

4. The method of processing fish material which comprises accumulating the material by successive charges into a storage vessel, treating the material of each charge with formaldehyde to prevent decomposition, transferring the treated material to a second vessel, heating the material in the second vessel sufficiently to drive off the formaldehyde but not sufficiently to complete digestion of the material, and while the material is still warm applying more heat to complete said digestion, and finally separating the solid and liquid constituents of the digested material.

5. The method of processing unpulped fish material which comprises treating the material with an aldehyde from the group consisting of formaldehyde and acetaldehyde to partially fix its solid constituents and partially release the liquids therefrom, then heating the treated material to further fix its solid constituents and further release the liquids therefrom, and then processing the material to separate the liquids from the solids.

6. The method of processing unpulped fish material which comprises treating the material with an aldehyde from the group consisting of formaldehyde and acetaldehyde to partially fix its solid constituents and partially release the liquids therefrom, then heating the treated material to further fix its solid constituents and further release the liquids therefrom, and then expressing the liquids from the material and separating the oil from the liquids.

7. The method of processing unpulped fish material which comprises treating the material with formaldehyde to partially fix its solid constituents and partially release the liquids therefrom, then heating the treated material to further fix its solid constituents and further release the liquids therefrom, and then processing the material to separate the oil from the solids.

8. The method of processing unpulped fish material which comprises treating the material with formaldehyde to partially fix its solid constituents and partially release the liquids therefrom, then heating the treated material to further fix its solid constituents and further release the liquids therefrom, and then expressing the liquids from the material and separating the oil from the liquids.

9. The method of processing unpulped fish material which comprises treating the material with formaldehyde in the proportions of approximately two to four pounds of formaldehyde to one ton of material to partially fix the solid constituents of the material and partially release the liquids therefrom, then heating the treated material to further fix its solid constituents and further release the liquids therefrom, and then processing the material to separate the oil from the solids.

10. The method of processing unpulped fish material which comprises treating the material with formaldehyde in the proportions of approximately two to four pounds of formaldehyde to one ton of material to partially fix the solid constituents of the material and partially release the liquids therefrom, then heating the treated material to further fix its solid constituents and further release the liquids therefrom, and then expressing the liquids from the material and separating the oil from the liquids.

11. The method claimed in claim 5, including the preliminary step of slightly acidulating the material.

12. The method of processing unpulped fish material which comprises treating the material with acetaldehyde in the proportions of approximately twenty to thirty pounds of acetaldehyde to one ton of material to partially fix the solid constituents of the material and partially release the liquids therefrom, then heating the treated material to further fix its solid constituents and further release the liquids therefrom, and then processing the material to separate the oil from the solids.

13. The method of processing unpulped fish material which comprises treating the material with acetaldehyde in the proportions of approximately twenty to thirty pounds of acetaldehyde to one ton of material to partially fix the solid constituents of the material and partially release the liquids therefrom, then heating the treated material to further fix its solid constituents and further release the liquids therefrom, and then expressing the liquids from the material and separating the oil from the liquids.

LAWRENCE T. HOPKINSON.